(12) United States Patent
Fink et al.

(10) Patent No.: US 11,762,099 B2
(45) Date of Patent: Sep. 19, 2023

(54) SYSTEM AND METHODS FOR COUNTERING SATELLITE-NAVIGATED MUNITIONS

(71) Applicant: Counter Echo Solutions, LLC, Atlanta, GA (US)

(72) Inventors: Andrew H. Fink, Swarthmore, PA (US); William A. Wilson, IV, Arlington, VA (US); Ryan Thomas Holte, McLean, VA (US)

(73) Assignee: COUNTER ECHO SOLUTIONS, LLC, Atlanta, GA (US)

( * ) Notice: Subject to any disclaimer, the term of this patent is extended or adjusted under 35 U.S.C. 154(b) by 269 days.

(21) Appl. No.: 17/378,042

(22) Filed: Jul. 16, 2021

(65) Prior Publication Data

US 2022/0075078 A1    Mar. 10, 2022

Related U.S. Application Data

(63) Continuation of application No. 16/786,998, filed on Feb. 10, 2020, now Pat. No. 11,067,696, which is a continuation of application No. 16/408,791, filed on May 10, 2019, now Pat. No. 10,564,286, which is a continuation of application No. 15/379,663, filed on Dec. 15, 2016, now Pat. No. 10,338,226, which is a continuation of application No. 14/194,731, filed on Mar. 2, 2014, now Pat. No. 9,523,773.

(60) Provisional application No. 61/786,066, filed on Mar. 14, 2013.

(51) Int. Cl.
*G01S 19/01* (2010.01)
*G01S 7/36* (2006.01)
*G01S 7/537* (2006.01)
*G01S 7/02* (2006.01)
*G01S 7/38* (2006.01)
*G01S 19/21* (2010.01)

(52) U.S. Cl.
CPC ............ *G01S 19/015* (2013.01); *G01S 7/021* (2013.01); *G01S 7/36* (2013.01); *G01S 7/38* (2013.01); *G01S 7/537* (2013.01); *G01S 19/215* (2013.01)

(58) Field of Classification Search
CPC ... G01S 7/021; G01S 7/36; G01S 7/38; G01S 7/537; G01S 19/015; G01S 19/215; G01S 13/886; G01S 13/887
See application file for complete search history.

(56) References Cited

U.S. PATENT DOCUMENTS

| | | | | |
|---|---|---|---|---|
| 4,467,328 A * | 8/1984 | Hacker | ...................... | G01S 7/38 342/368 |
| 4,635,880 A * | 1/1987 | Jehle | .......................... | G01S 7/38 244/3.14 |
| 4,876,545 A * | 10/1989 | Carlson | ..................... | H04K 3/44 342/14 |
| 4,990,920 A * | 2/1991 | Sanders, Jr. | ............... | G01S 7/38 342/14 |
| 5,574,458 A * | 11/1996 | Tran | ........................... | G01S 7/38 342/13 |

(Continued)

*Primary Examiner* — Peter M Bythrow
(74) *Attorney, Agent, or Firm* — John L. Doughty; DOUGHTY LAW, L.L.C.

(57) ABSTRACT

A defense system that receives information regarding an incoming object(s), then automatically coordinates spoofing or jamming of SATNAV signals potentially used by the incoming object(s) while also informing friendly systems of the spoofing or jamming of SATNAV signal.

20 Claims, 3 Drawing Sheets

(56) References Cited

U.S. PATENT DOCUMENTS

| | | | |
|---|---|---|---|
| 5,884,040 A * | 3/1999 | Chung | H04L 12/413 709/227 |
| 6,393,254 B1 * | 5/2002 | Pousada Carballo | H04K 3/43 455/88 |
| 6,480,140 B1 * | 11/2002 | Rosefsky | G01S 7/38 342/13 |
| 6,483,452 B1 * | 11/2002 | Iwakini | G01S 7/022 342/72 |
| 6,490,455 B1 * | 12/2002 | Park | H04K 3/45 455/461 |
| 6,496,703 B1 * | 12/2002 | da Silva | H04W 48/04 379/70 |
| 6,697,008 B1 * | 2/2004 | Sternowski | G01S 7/38 342/353 |
| 7,138,936 B2 * | 11/2006 | Duff | G01S 7/38 342/13 |
| 7,423,575 B2 * | 9/2008 | Duff | G01S 7/38 342/13 |
| 7,783,246 B2 * | 8/2010 | Twitchell, Jr. | H04K 3/28 455/420 |
| 7,873,095 B1 * | 1/2011 | Stockmaster | H04K 3/28 375/132 |
| 7,912,643 B1 * | 3/2011 | Bean | G01S 19/215 342/357.29 |
| 7,952,519 B1 * | 5/2011 | Nielsen | G01S 19/215 342/357.59 |
| 8,258,994 B2 * | 9/2012 | Hamilton | F41G 7/224 250/493.1 |
| 8,543,053 B1 * | 9/2013 | Melamed | H04K 3/46 455/226.1 |
| 8,903,304 B2 * | 12/2014 | Coleman | H04K 3/43 455/67.11 |
| 9,466,881 B1 * | 10/2016 | Berry | G01C 21/20 |
| 2004/0263378 A1 * | 12/2004 | Jossef | G01S 7/022 342/194 |
| 2006/0164282 A1 * | 7/2006 | Duff | H04K 3/45 342/13 |
| 2006/0287822 A1 * | 12/2006 | Twitchell, Jr. | G01S 19/21 701/470 |
| 2007/0004330 A1 * | 1/2007 | Twitchell, Jr. | G01S 19/03 455/1 |
| 2007/0004331 A1 * | 1/2007 | Twitchell, Jr. | G01S 19/21 455/1 |
| 2007/0273571 A1 * | 11/2007 | Mortimer | G01S 5/0018 342/13 |
| 2008/0018519 A1 * | 1/2008 | Berg | F41H 13/0068 342/67 |
| 2008/0190274 A1 * | 8/2008 | Kirkpatrick | F41J 2/02 342/13 |
| 2008/0191924 A1 * | 8/2008 | Duff | H04K 3/65 342/14 |
| 2010/0283656 A1 * | 11/2010 | Zavrel, Jr. | G01S 7/38 375/135 |
| 2010/0315281 A1 * | 12/2010 | Askelson | G08G 5/0013 703/2 |
| 2012/0176269 A1 * | 7/2012 | Holton | H04K 3/94 342/169 |
| 2012/0217301 A1 * | 8/2012 | Namey | F41G 3/04 235/411 |

* cited by examiner

SYSTEM AND METHODS FOR COUNTERING SATELLITE-NAVIGATED MUNITIONS

CROSS-REFERENCE TO RELATED APPLICATIONS

This application is a continuation of U.S. patent application Ser. No. 16/786,998 filed Feb. 10, 2020, which is a continuation of U.S. patent application Ser. No. 16/408,791 filed May 10, 2019, which is a continuation of U.S. patent application Ser. No. 15/379,663 filed Dec. 15, 2016, which is a continuation of U.S. patent application Ser. No. 14/194,731 filed Mar. 2, 2014, which is a non-provisional application claiming the benefit of U.S. Provisional Application Ser. No. 61/786,066 filed Mar. 14, 2013 entitled "System and Methods for Countering Satellite-Navigated Munitions," the entireties of which are hereby incorporated by reference.

TECHNICAL FIELD

Aspects disclosed herein relate generally to disrupting attacks from incoming projectiles through electronic warfare and electronic counter measures; more particularly to tracking incoming projectiles through the use of radar, then jamming or spoofing satellite-guided or satellite-navigation (SATNAV) frequencies used by incoming projectiles for navigation.

BACKGROUND

Hostile unmanned aerial vehicles and precision guided munitions (PGMs) frequently use satellite signals to navigate to a designated target. Such PGMs can include, for example, guided mortars, guided artillery projectiles, unmanned aerial vehicles (UAVs), missiles, glide bombs, and other projectiles capable of acquiring and using global positioning systems (GPS) or other SATNAV signals for guidance. A typical SATNAV PGM guidance system receives satellite signals to guide itself to a designated target. The satellite signals can be based on GPS technology or SATNAV alternatives to GPS, such as GLONASS, Galileo, or Beidou for example.

Current countermeasures against incoming objects use projectiles, such as bullets, that are configured to destroy or to disrupt the trajectory of an incoming projectile. The problems with countering a projectile with a counter-projectile, however, are numerous including the possibility of inadvertently striking a friendly aircraft or civilian buildings, reloading issues, shrapnel, and the possibility of mis-firing.

Another countermeasure option involves the use of a targeted electromagnetic beam to heat a projectile to a disruption temperature to deflagrate the projectile. This solution, however, also risks potential problems with inadvertently damaging civilian aircraft or infrastructure and issues involving the energy or chemicals such a system would require.

Another countermeasure option, for missiles or weapons targeting vehicles in motion, is described in U.S. Pat. No. 7,489,264. That option contemplates using multiple electronic signals to coordinate electronic jamming signals for protecting multiple vehicles physically separated from one another against Home-on-Jam weapons. The vehicles exchange messages and coordinate a system to emit an alternate jamming signal creating a false target. The '264 system, however, does not contemplate a satellite guided projectile or a fixed-position defense.

Another countermeasure option, for SATNAV broadly, is to disrupt or eliminate satellite communication for all area-wide guidance systems at the satellite's transmission. This elimination, jamming, or spoofing of all satellite communication, however, would also disrupt all nearby equipment that also relies on SATNAV signals to operate, including UAVs, communication systems, and hand-held GPS navigation devices. The consequences of persistently jamming or spoofing all SATNAV signals in order to disrupt an incoming PGM attack would severely disrupt broad military and civilian activities. Additionally, there might be serious diplomatic consequences for disrupting the SATNAV signals of a system belonging to another state or, for example, on an expeditionary force disrupting the use of civilian GPS signals in a foreign city.

Hence, it is known to coordinate the transmission of jamming signals from a plurality of cooperating vehicles, and to shut down all STANAV guidance systems through disruption of satellite transmissions. However, there is yet no technical solution for targeted defending of a fixed position or base against incoming projectile(s) through disruption of localized satellite signals guiding the projectile(s).

SUMMARY

The exemplary implementations herein can alleviate the above problem and thus provide an efficient and reliable solution for improving a position's chances of evading any incoming projectile guided by SATNAV while allowing general satellite communications to continue in an area.

According to exemplary implementations, the system can consist of one or several directional and omnidirectional SATNAV jamming or spoofing antennae linked to a computer with software capable of processing data sent from detection systems such as battlefield radars. Various aspects can direct and coordinate the jamming or spoofing activity of the antenna or antennae based on data provided by other detection systems and pre-set user inputs. When an incoming projectile attack is detected, the system can automatically analyze data sent by other systems and can respond based on other inputs to, for example, automatically direct a targeted directional SATNAV jamming beam to illuminate (and in some example implementations to misdirect) on one or several projectiles.

In other implementations, by providing a user with pre-set operational modes and the ability to customize the activity of the SATNAV jamming or spoofing antenna or antennae, the system's software management can enable front-line personnel to operate aspects or restrict the system to no user input. The system can enable automatic directional SATNAV jamming or spoofing against all potential inbound precision guided munitions while still allowing the use of friendly SATNAV systems with no disruption.

In other implementations, the system can automatically activate an audio signal to reassure personnel that SATNAV PGMs are being jammed to reduce the potential psychological strain of an attack.

In other implementations, to prevent munitions from accurately homing in on jamming antennae, the system can include automatic switches to turn various antennae on and off in rapid succession while still maintaining persistent jamming of the targeted SATNAV signals. This automatic system can coordinate several directional antennae tracking a target, or targets, and emitting identical SATNAV jamming signals to switch on and off while still ensuring that the targeted object or objects are persistently illuminated.

Other advantages, advantageous features and applications of the exemplary system and implementations thereto will be apparent from the following description and the dependent claims.

DETAILED DESCRIPTION

The following section describes example implementations of a centralized SATNAV jamming system to protect positions from incoming projectiles.

Figure 1:
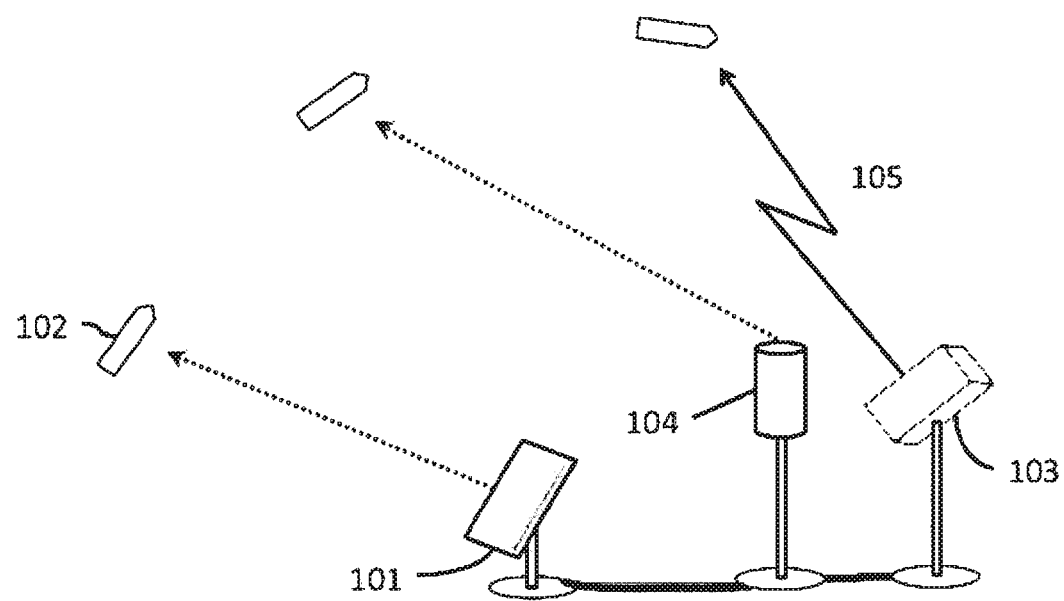
FIG. 1 illustrates an electronic warfare situation in which the exemplary implementations (i.e., embodiments) can be employed to misdirect an incoming projectile through the use of SATNAV jamming.

FIG. 1 illustrates an example battlefield radar, or other detection system, 101 which detects a possible hostile incoming object(s), 102. The aerial object might be an unmanned aerial vehicle (UAV), a mortar round, a missile, a bomb, or some other type of projectile guided by satellite navigation. The incoming object might be a SATNAV precision guided munition (PGM). Counter-battery radar systems that detect incoming objects already exist, and are known to those of ordinary skill in the art. Counter-battery radar systems, for example the AN/MPQ-64 or the AN/TPQ-48, automatically detect incoming attacks and have been implemented with systems that automatically generates an alert, for example sounds an alarm. These systems are often operative to determine and identify the origin, type, and position of the incoming object. After detecting a possible attack, the detection system can be programmed to automatically transmit available data concerning the location, velocity, and type of incoming projectile to the directional jamming system 103. The data can be received by example implementations and aspects. In addition to the battlefield radar data, the directional jamming system 103, can receive inputs by a user and/or data from a separate targeting radar, 104. The system would then process the information and transmit (or emit) a SATNAV jamming signal or signals, 105, at the suspected projectile, disrupting any possible SATNAV guidance.

The jamming signal(s), 105, can be a focused directional jam to block any potential SATNAV signal acquisition by the suspected incoming object, or can include an omnidirectional jamming signal, which can be used in situations in which there are many incoming objects approaching from more azimuths than the system has directional antennas or the jamming signal(s) can be a combination of directional and omnidirectional jamming. The precise automatic response can be determined based on pre-set user inputs to the system's operating software. Additionally, since it can be undeterminable whether the incoming object is a PGM, the jamming signals can be transmitted at suspected PGMs regardless of confirmation that the projectile is satellite navigated. The system can also transmit or emit a signal warning nearby systems that a SATNAV jammer is active. This warning can be embedded in the jamming signal itself to friendly devices using satellite navigation.

After the directional jamming system 103 has jammed the signal(s) potentially received by the projectile 102, the projectile can continue unguided or potentially be destroyed by a separate system. The SATNAV guided PGM will be unable to acquire a SATNAV signal, can fly unguided, and can have a greater chance of not striking its intended target. Although aerial objects have been discussed, example implementations and aspects can also be used to disable other types of incoming objects, which can be, for example, a ground-based vehicle, such as an unmanned small rover or car, or water-based incoming objects, including those detectable by infrared, optical, or sonar systems, as opposed to battlefield radar systems. Examples of such water-based incoming objects can include unmanned submersible craft, unmanned surface vehicles, and torpedoes.

The directional jamming system 103, can comprise one or more computer systems having one or more microcontrollers, memory devices, storage devices, and input/output devices. Each of these components can be interconnected using, for example, a system bus.

The one or multiple microcontrollers, within directional jamming system 103 can be one or more processors, or application-specific integrated circuits and can process instructions for execution within the system. In some implementations, the processor can be a single-threaded processor. In other implementations, the processor can be a multi-threaded processor. The one or more microcontrollers can be capable of executing or processing computer instructions stored in one or more memory devices, or on one or more storage devices. The software modules can be operable to allow the system to receive one or more inputs, process the inputs, and relay one or more commands or orders.

The one or more memory devices within directional jamming system 103 can store a variety of information and data, including data received from, for example, counter-battery radars and user inputs. In one implementation, such memory can be a computer-readable medium. The memory devices can include both volatile memory and non-volatile memory, including such devices as RAM, ROM, Flash, PROM, EPROM, EEPROM, etc.

The one or more storage devices within directional jamming system 103 can be capable of providing mass storage. The storage device(s) can be a computer-readable medium, and in various different implementations, can include a hard disk device, an optical disk device, flash memory, solid state drive, or some other storage device.

One or more input/output devices within directional jamming system 103 can provide input/output operations. In example implementations, the input/output device can include one or more public service telephone trunk interfaces, for example an RJ11 connector, an IP network interface device, for example an Ethernet card, a cellular network interface, for example LTE, a serial communication device, for example an RS-232 port, and/or a wireless interface device, for example an 802.11 wireless transceiver. The input/output device can include driver devices configured to receive input data and send output data to other input/output devices, as well as sending communications to and receiving communications from various networks.

Example implementations of the directional jamming system 103 can be operable to process a variety of inputs, based on the level of risk a user of the system is willing to accept, as well as the particular threats that the user faces. The system 103 can address, for example, how focused the directed jamming signals can be, how quickly and precisely the jamming signals can be moved to "trace" the targeted munitions, how powerful the jamming signals should be, and what is the best compromise between safety and possible civilian/friendly SATNAV disruption.

Figure 2:
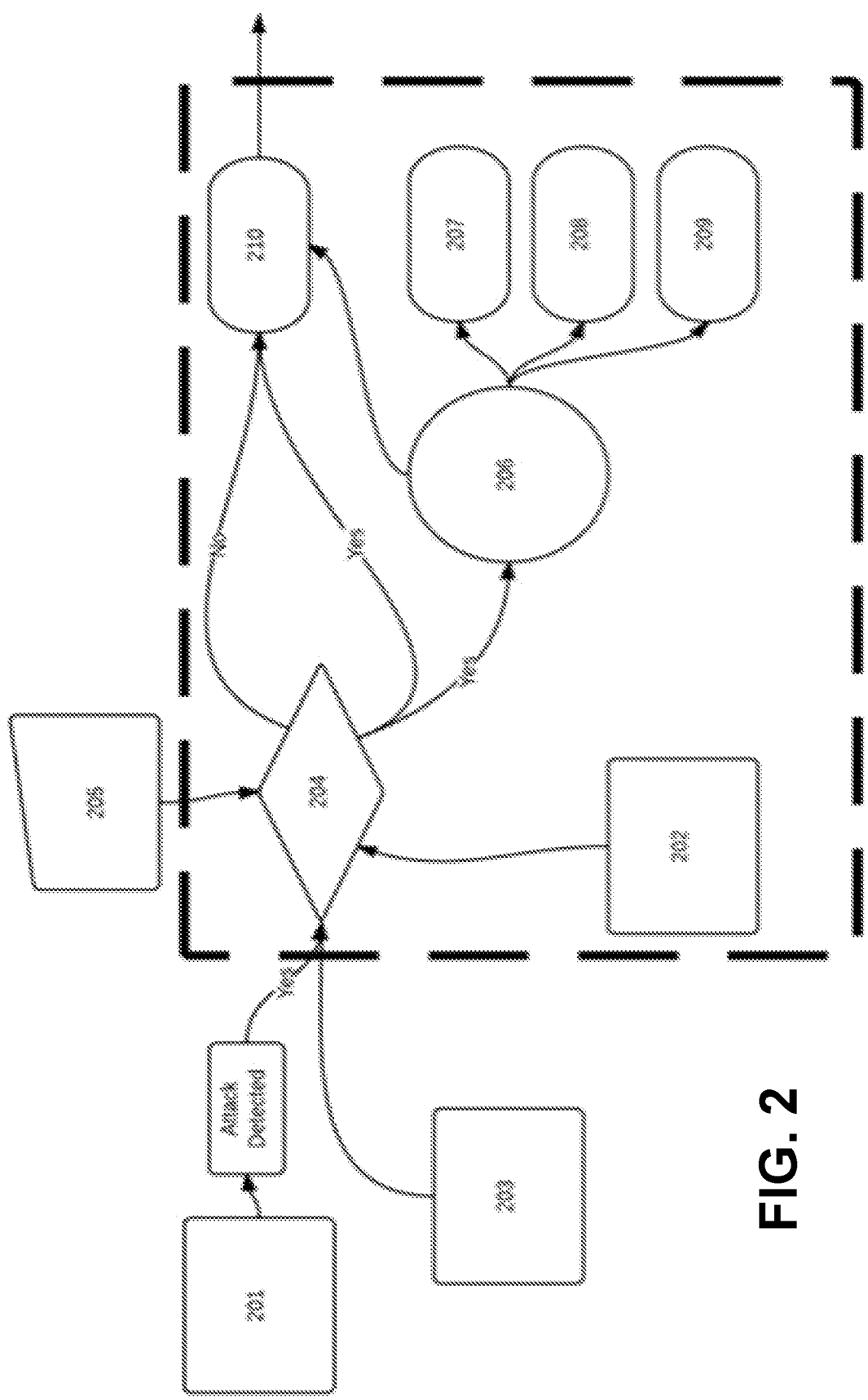
FIG. 2 shows example block diagrams of an example implantation of a system's operability functions.

With reference to FIG. 2, example implementations can be operable to receive a variety of data inputs and execute a variety of different outputs. In example implementations, the system 103 can have one or more interface modules for receiving those inputs. The devices that provide data to the system 103 can also have one or more modules for interfacing with aspects.

As illustrated in FIG. 2, the system 103 can be operable to receive data input 201 from a variety of detection systems. For example, the system 103 can receive data from one or several counter-battery radar systems, 101. The counter-battery radar, via one or more interfaces, can send data, such as location and trajectory information, concerning an incoming object. The system 103 can be tuned for optimal performance with a wide variety of battlefield radar systems and other detection systems. Advance knowledge of the margins of error and tolerance provided by different systems can be used to configure how tight or wide the broadcast SATNAV jamming signals, 105, are. In example implementations, the system 103 can be deployed in a configuration in which the system 103 possesses its own targeting radar 101. Data from a counter-battery radar system can be used to determine the search area for the targeting radar resulting in the possibility of a more precise jamming signal.

As shown in the FIG. 2 example flow chart detailing a example operability functions, implementations of the system 103 can function with a computer containing decision-making software 204 that receives a digital signal 201 from a variety of detection devices including input from, for example, a counter-battery radar 101. In this example, the battlefield radar 101 can provide a digital signal 201 to the computer containing the decision-making software 204 regarding the type, location, speed, and trajectory of an incoming projectile in relation to the system's 103 location. The system 103 can also receive data from other outside devices 203 including, for example, an Identification Friend/Foe device (IFF), Blue Force Tracker (BFT), or an equivalent identification system. The data provided by these devices can, for example, provide the system 103 with information indicating when a friendly aircraft (or a critical item that is dependent on SATNAV) is within range of the system's jamming signal. The computer containing decision-making software 204 can operate according to user inputs 205 and can also incorporate data from a battlefield targeting radar(s) 202. After the computer containing decision-making software 204 has determined an action, it can be operative to order jamming antennae microcontrollers 206 to activate and direct the operation of directional SATNAV jammers 207, omnidirectional SATNAV jammers 208, and mechanical actuators 209 which can orient the directional SATNAV jammers 207. Additionally, the system 103 can provide output data feedback 210 to other devices such as BFF or IFF.

The system 103 can be operable to automatically transmit an omnidirectional signal along pre-set frequencies when an indirect fire attack involving an incoming object, which can be a PGM, is detected. The system 103 can allow a user to specify that omnidirectional SATNAV jamming signals be activated for a specified period. The user can designate the omnidirectional jamming mode and the specified period, for example, in a situation in which the incoming object's target (e.g., a military base) is remote and there is little fear of omnidirectional jamming signals impacting the acquisition of SATNAV signals related to non-hostile operations.

In some example implementations of the system 103, the SATNAV jamming signals 105 can be automatically directed in the predicted location of an incoming object 102, or objects, or transmitted more precisely at an incoming object(s). In example implementations, the system 103 can be operable to receive a user input that specifies the tightness of the directional jamming signal 105, and can also be operable to allow the width and strength of the jamming signal to be specified by the user. In example implementations, the system 103 can be operable to transmit multiple jamming signal(s) directed at multiple incoming targets from multiple azimuths using, for example, separate transmitting emitters like directional antennas. The system 103 can also transmit directional jamming signals in a single arc that can be spread to cover multiple targets. The system 103 can be operable to transmit the SATNAV jamming signals 105 to illuminate an object until impact, or to illuminate the object for a user-specified period, or to only illuminate an object it is traveling through certain altitudes, or certain areas. In example implementations, the system 103 can focus the directional jamming mode functions sufficiently so as not to disrupt friendly devices that also use satellite signals. Thus, the system 103 can be used in areas where other nearby non-hostile systems depend on SATNAV signals.

In example implementations, the system 103 can also be operable to switch from a directional jamming mode to an omnidirectional jamming mode or vice versa. Here, for example, the system 103 might begin in a directional jamming mode. Should attacks from multiple azimuths (or a number of incoming rounds above a user-specified setting) be detected, the system can automatically switch from a directional jamming mode to an omnidirectional jamming mode of operation. Such a mode of operation can be determined in a scenario in which large salvo attacks are expected (or detected).

In example implementations, the system 103 can also be operable to account for the proximity of friendly systems. For example, the system can be operable to receive an input from the user that sets the system to either cease operation, or to switch to a specified mode of operation, when Blue Force Tracker (BFT), Identification Friend or Foe (IFF), or a similar system indicates that a friendly aircraft or critically-deemed system that is dependent on SATNAV is within range of the jamming signal of the system 103, such as another incoming projectile defense device dependent on SATNAV signals. Additionally, the system 103 can be operable to allow a user to set the system 103 to not operate when certain specified systems or aircraft are nearby. This mode can be useful at facilities that cannot afford SATNAV disruption, have a low-risk of PGM attack, or areas located near a system where critical operations requiring SATNAV are taking place, such as attacks on enemy forces with PGMs. This mode can also be useful for VIP protection.

Based on date information inputs, like radar tracking, example implementations of the system 103 can be operable to determine the likely points of impact of a detected object. The system 103 can allow a user to specify that if the incoming object's determined impact area falls within a user specified area, the system 103 can be operable to activate a jamming option, including omnidirectional, directional, or directional to omnidirectional, or another option such as jamming at a particular point in an object's flight path, customized to the requirements of the user. The system 103 can also be operable to prioritize the protection of one or more predicted impact locations over others in the event that omnidirectional jamming mode is determined not to be feasible. For example, a user can use a numerical ranking system (e.g., from 1 to 10), indicating which target is the most important (e.g., assign the most critical target that should be defended a priority of "1"). The system can further be operable to respond to attacks originating from specified directions, or to switch modes based on the number and direction of the detected attack. This added flexibility can allow the example implementations and aspects to be responsive in a variety of dynamic battlefield situations.

In example implementations, the system can also be operable to communicate operations information to other friendly devices. FIG. 2 output 210 details system data from the system 103 to communicate its presence and the activity of its jamming antennae to other friendly units through BFT or some other analogous system, and/or it can transmit/ broadcast a warning to alert friendly civilian equipment. In addition, a user can allow the system to broadcast its current operating mode, for example directional or omnidirectional, via BFT, or radio, or some other communication system and/or to announce when it is jamming and also the type of jamming it is conducting. In some example implementations, a digital warning that a SATNAV jamming event is occurring can be incorporated into the jamming signals themselves to prompt an automatic response from nearby UAVs or other automated systems that depend on the SATNAV signal, including civilian systems. In other example implementations, if the user enables the SATNAV disruption warning option, the system 103 can alert other units/aircraft or civilian receivers that a jammer is in the area before any jamming occurs.

In example implementations, the system 103 can also be operable to allow a user to specify times and dates that the system 103 will not operate, or within which it will enter a specified mode of operation. In example implementations, a sensor next to the antennae records certain climactic conditions (e.g., wind speed), and is operable to send those sensor readings to the system 103. If the user believes that certain climactic conditions, for example high winds, would potentially make tightly-targeted directional jamming inaccurate, the user could specify that only omnidirectional jamming, or directional jamming with a wider beam, are to be used in those climactic conditions. If the climactic conditions are present based on the sensor readings, then the system 103 can be operative to go into the mode specified by the user for those conditions.

In some example implementations, the system can also be operable to allow a user to temporarily deactivate the system 103, or change its operating mode while critical operations that require SATNAV are taking place. This setting can be scheduled in advance or activated by BFT, IFF, or a similar system.

In some example implementations, the system 103 can also be operable to receive input from field detection systems, such as a battlefield radar, and only automatically activate when an attack is detected in which the incoming object is of a pre-selected type, such as a mortar, UAV, cruise missile, rocket, or any combination of the preceding, and to ignore all non-selected projectile types. Based on field detection systems, the system 103 can also be operable to only activate, for example, when objects known to have a potential SATNAV guidance are detected.

Referring again to FIG. 1, in example implementations, the system 103 can also integrate a battlefield targeting radar 101 in the same housing to provide data input 201 to the decision-making software module 204. This can be useful in the event of deployment in a location that lacks counter-battery radar capabilities. In other example implementations, the radar can also be an existing system and integrated with the system 103, rather than a separate system connecting to the system 103.

Referring again to FIG. 2, decision making software 204 can be one or more microcontrollers operable to communicate with the system computer. The system computer can also have one or more microcontrollers, for example processors, operable to execute the decision making software. An example implementation of this is illustrated in FIG. 3.

Figure 3:
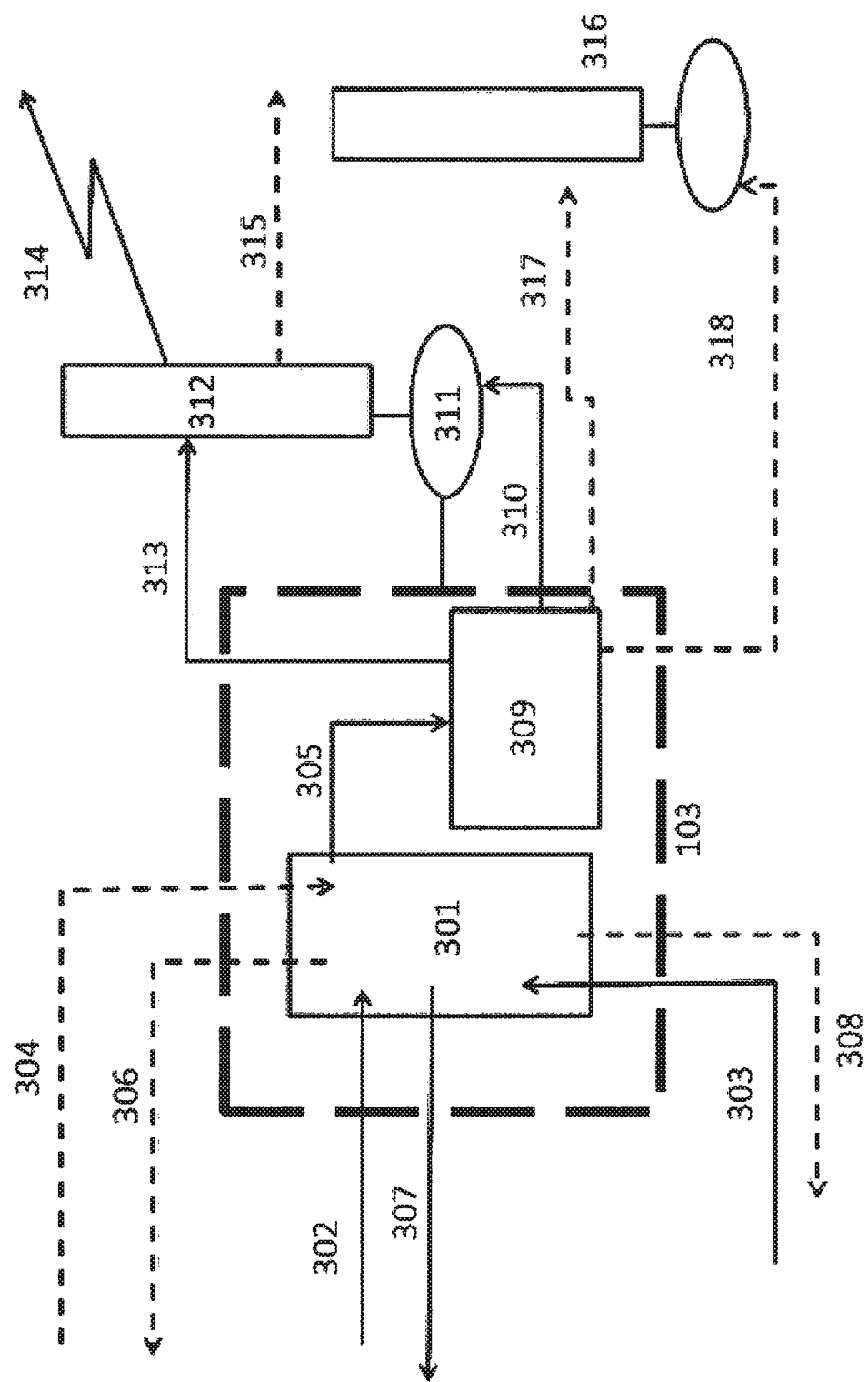
FIG. 3 shows an example flow diagram for the system illustrating various information sources and outputs.

FIG. 3 is a block diagram of an example implementation showing example components of the system and some of the example various inputs/outputs to the system. Referring now to FIG. 3, system components and system inputs/outputs of a an example implementation can include a system computer containing decision-making software 301 that can be similar to the software described in conjunction with element 204. The system computer 301 can receive data input from a battlefield radar 302, a user, an IFF or BTF 303, or from a targeting radar 304. The input from the battlefield radar 302 can be similar to the on described for digital signal 201. The input from the user, IFF, BFT, or other systems 303 can be similar to the one described for element 205 or 206. The data from the targeting radar 304 can be similar to that described for element 202. The system computer 301 can also provide output data feedback to the targeting radar 306, which can include, for example, the gross search area for the targeting radar. The system computer 301 can also provide output data feedback to BFT, IFF, or other systems 308. This feedback can be similar to the feedback illustrated in 210. The system computer 301 can also provide a warning 307 to other systems when the SATNAV jammer is operating. The system 103 can provide orders 305 to microcontrollers 309 which transmit output control data 313 to a jamming antenna 312, and output control data 310 to an actuator 311 that orients the jamming antenna 312. When it receives an order, the jamming antenna can transmit or emit a SATNAV jamming signal 314 and a warning signal 315 that the SATNAV jammer is operating. The warning signal 315 can be digitally transmitted within the jamming signal 314 or separate from the jamming signal. The system can also transmit output control data to jammers 317 or actuators 318 as for control of additional antennae 316.

As can be seen in FIG. 3, example implementations can utilize microcontrollers to control the actuators that direct the movement of the directional emitters and control the SATNAV jammers. FIG. 3 details the microcontrollers as separate from the microcontroller that executes the decision making software residing within the system's computer. However, in other example implementations, these microcontrollers might be singular with multi-functions. In yet other example implementations, the system can include a plurality of microcontrollers.

An example implementation can include a SATNAV jammer or jammers 105 that can transmit or emit signals to disrupt the acquisition of satellite signals used by incoming satellite guided threats. In example implementations, based on user input, the system's automatic jamming response to an attack is emitted by a SATNAV jammer 105. The jamming signals can be across all known SATNAV frequencies, or target particular frequencies. The characteristics, including direction, of the jamming 105 can be omnidirectional, directional wherein the arc can be specified by user or changed depending on the number and direction of targeted objects, specifically targeted, or of a certain frequency or frequencies all selected by a user. In example implementations, different objects 102 can be targeted with different responses—for example, a targeted jamming response when an object that behaves like a mortar and an omnidirectional jamming response when an object is detected that behaves like a rocket; or, for example, transmitting a targeted beam that jams civilian GPS signals combined with omnidirectional GLONASS jamming whenever an indirect fire attack is detected or a jamming response against only military SATNAV signals when a glide-bomb attack is detected. The user can also specify the signal strength of jamming against different signals that are transmitted simultaneously.

Example implementations can include a SATNAV jammer with, for example, one or more antennas, antenna arrays, and/or parabolic emitters, 207, 208, or 312. The antennas and parabolic emitters can be directional or omnidirectional. Such antennae are known to those of ordinary skill in the art. For example, a type of transmitting antenna this system 103 can use would be a non-traversing directional antennae located at the top of a tower. The antenna can be angled upward to automatically cover a large area while attempting to leave ground equipment unaffected by the jamming signal. Field testing can determine the antenna type, proper frequency, power, width, or angle of the various jamming signals the user can specify in order to respond to different adversaries in different environments. Based on sufficient data retrieved from detection systems, a user can create customized modes to respond in different ways to particular types of attack. For example, if the attacker only has mortars guided by a civilian GPS receiver, the user can specify jamming only the civilian GPS signals when an incoming mortar attack is detected and no jamming response when a rocket attack is detected. Or, for example, if the user believes the potential enemy only has SATNAV PGMs which can correct effectively above or below a certain altitude, the user can specify a jamming response only when a detected object is within these altitude parameters. As another example, the user can designate a particular response based upon a specified time period.

One variety of antennae which the system 103 can include (or be operative to communicate with) is a directional parabolic antenna with an actuator (or actuators) capable of rotating the directional antenna 360 degrees and elevating it 200 or more degrees, for example. This antenna can include a tower or similar stand with directional jamming antennae at the top. To ensure the accuracy of firing solutions, some model antennae used could have a leveling actuator to ensure the directional antennae apparatus is level and carry out the jamming solutions accurately. A microcontroller could also be attached to the directional jamming antennae to control actuators in response to the system's central computer.

Example implementations can include a multi-Global Navigation Satellite System (GNSS) receiver that can be located directly under the jammer to provide a close approximation of the jammer to the system's central computer or any other computers or systems that are integrated with the system. This information could assist in calculating firing solutions for the directional antennae. Other measurement information can be used to locate and calibrate the directional antennae. The multi-GNSS receiver could also be used to confirm that some jamming signals are working correctly.

Referring to FIG. 2, example implementations can include SATNAV jammer outputs 207 and 209 that transmit or emit signals that spoof a PGM's navigation computer to direct the PGM off its set-course to a predetermined location. Such "spoofing" can be completed by sending false signals imitating SATNAV signals which would cause the PGM to guide itself to a pre-determined location.

In example implementations the system 103 can be integrated with, for example, a military base automatic alarm system that sounds when an inbound attack is detected, for example via a "giant voice" system, or some other audible alert system. In some implementations, the system can be operable to, upon detection of an indirect fire attack, automatically sound an audible signal alongside the alarm in order to reassure personnel and inform them that incoming SATNAV guided munitions are being jammed. This feature can serve to counter the psychological effects of a possible PGM attack.

Example implementations of the system 103 can also include hardened jamming antennae and/or placing the antennae at a distance from the system's components. The antennae can alternate their use during an attack to frustrate jam-homing munitions, and/or automatically switch to another back-up antenna if one is disabled. Additionally, the system 103 can automatically direct several directional antennae that are tracking a target or targets and emit identical SATNAV jamming signals to switch on and off while still ensuring that the targeted object or objects are persistently illuminated.

In example implementations, the system 103 can work on any navigation system that uses a technology similar to SATNAV to enable navigation, such as ground based navigation systems.

What is claimed is:

1. A system, comprising:
a processor to:
receive information via a communication interface, wherein the information comprises data regarding an incoming object;
processing the received information; and
based on the processing of the received information, send a command that is usable to facilitate an emission of jamming signals by one or more antennas to disrupt a satellite navigation signal potentially received by the incoming object.

2. The system of claim 1, wherein the information received via the communication interface was transmitted from a cellular network.

3. The system of claim 1, wherein, the jamming signals are emitted in accordance with a directional mode of operation.

4. The system of claim 1, wherein, the jamming signals are emitted in accordance with an omnidirectional mode of operation.

5. The system of claim 1, wherein the communication interface is a wireless communication protocol interface.

6. The system of claim 1, wherein an actuator rotates one or more of the one or more antennas.

7. The system of claim 5, wherein the communication protocol interface is a cellular network interface.

8. The system of claim 1, wherein the received information includes data generated by a Global Navigation Satellite System device and wherein the received data is used to calculate a firing solution associated with the emission of the jamming signals.

9. The system of claim 5, wherein the communication protocol interface is an 802.11 interface.

10. A method, comprising:
receiving, by a jamming control system, information via a communication interface, wherein the information comprises data regarding an incoming object;
based on the received information, selecting, by the jamming control system, a mode of operation related to emission of one or more jamming signals; and sending, by the jamming control system, a command that is usable to facilitate emission of the one or more jamming signals by one or more antennas to disrupt a satellite navigation signal potentially received by the incoming object, in accordance with the mode of operation selected.

11. The method of claim 10, wherein the information comprises the position of the incoming object.

12. The method of claim 10, further comprising determining, by the jamming control system, a trajectory of the incoming object.

13. The method of claim 10, wherein the one or more antennas comprise an antenna array.

14. The method of claim 10, wherein a power associated with the emission of the one or more jamming signals is variable.

15. The method of claim 10, wherein the incoming object is one of a plurality of incoming objects, and wherein the mode of operation is selected based on a threshold number of the plurality of incoming objects.

16. A method, comprising:
receiving, by a jamming control system, information via a wireless communication interface, wherein the information comprises data regarding an incoming object;
processing, by the jamming control system, the information received,
based on the information, selecting, by the jamming control system, a directional operational mode related to a first jamming signal emission;
sending, by the jamming control system, a first command that is usable to facilitate emitting the first jamming signal emission by an antenna to disrupt a satellite navigation signal potentially received by the incoming object, in accordance with the directional operational mode;
based on further information received from the incoming object detector, wherein the further information indicates a plurality of incoming objects, selecting, by the jamming control system, an omnidirectional operational mode relating to a second jamming signal emission; and
sending, by jamming control system, a second command that is usable to facilitate emitting the second jamming signal emission by the antenna to disrupt satellite navigation signals potentially received by the incoming objects, in accordance with the omnidirectional operational mode.

17. The method of claim 16, further comprising determining, by the jamming control system, not to emit the first jamming signal emission based on an indication of friendly forces operating in an area in proximity to the jamming control system.

18. The method of claim 16, further comprising determining, by the jamming control system, not to emit the first jamming signal emission based on a value assigned to a target of the incoming object.

19. The method of claim 18, wherein the jamming control system is operable for receiving a user input, wherein the user input comprises the value.

20. The method of claim 16, wherein the antenna is a primary antenna, and a backup antenna is selected when the primary antenna is inoperable.

* * * * *